(No Model.)
J. WOLFF.
SARDINE CAN.
No. 299,710.  Patented June 3, 1884.
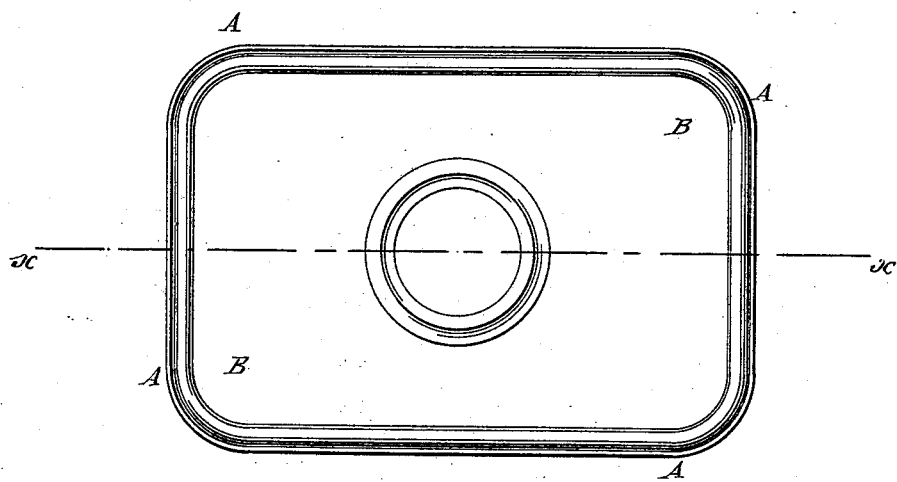
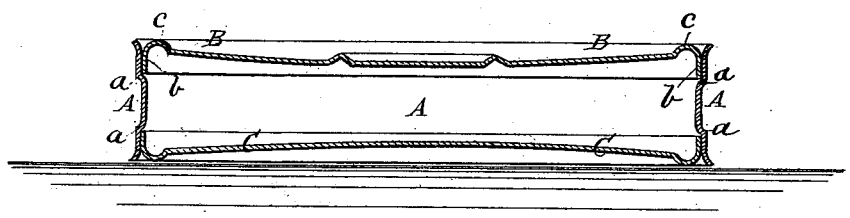
WITNESSES:
INVENTOR:

UNITED STATES PATENT OFFICE.

JULIUS WOLFF, OF NEW YORK, N. Y.

SARDINE-CAN.

SPECIFICATION forming part of Letters Patent No. 299,710, dated June 3, 1884.

Application filed April 8, 1884. (No model.)

*To all whom it may concern:*

Be it known that I, JULIUS WOLFF, of the city, county, and State of New York, have invented a new and useful Improvement in Sardine-Cans, of which the following is a full, clear, and exact description.

Reference is to be had to the accompanying drawings, forming part of this specification, in which similar letters of reference indicate corresponding parts in both the figures.

Figure 1 is a plan view of one of my improved sardine-cans. Fig. 2 is a sectional side elevation of the same on the line $x\ x$ in Fig. 1.

The object of this invention is to facilitate the canning of sardines and secure the preservation of canned sardines.

The invention consists of a sardine-can having its top or bottom, or both, concave, and secured within the body of the can, all as hereinafter fully described, and pointed out in the claims.

In canning sardines as heretofore practiced the cans are made with flat or slightly convexed tops and bottoms. The fish are packed into the cans and oil poured over them until the body of the can is filled with oil. The tops of the cans are then soldered on and the cans are placed in water or steam and boiled a sufficient time to preserve the fish. The cans are then removed, and if the soldering was properly done the top and bottom of the cans are in a convexed shape from the expansion of the inclosed air by the heat. The cans are then punched to allow the inclosed air to escape, and the puncture is then closed with solder. In this process, when the cans are punched to allow the inclosed air to escape, the escaping air carries a portion of the oil with it, so that when the cans are opened the fish are found to be only partially covered with oil, and consequently not in a state of perfect preservation.

In my improved cans the body A is made in the ordinary manner, with the offsets $a''$, and the top B and bottom C are provided with the flange $b$ and the bead $c$, as usual. Instead of making the top B or both the top B and bottom C flat or slightly convexed, as usual, I make either or both concaved, as shown in Fig. 2.

In using my improved cans the fish are packed into the said cans, and oil is poured in until the bodies of the cans are full. The tops B are then applied to the cans and soldered on. In this operation the depression of the middle parts of the tops B of the cans causes the air in the said cans to collect around the edges of the said tops B, and the heat of the soldering-tools heats the air and oil along the said edges and causes the air to expand and escape in front of the soldering-tools as they pass along the said edges, so that when the soldering is completed the air will be sufficiently expelled. The filled cans are then boiled in the ordinary manner, and if the soldering has been properly done the expansion of the small quantity of air left in the cans will have expanded, the concaved top and bottoms B C into an approximately level or horizontal position, and the cans are ready to be cooled and stored for market. In case the tops and bottoms of the cans, when the boiling operation has been completed, have not been expanded into level positions, it shows that the soldering was not properly done, and that the inclosed air and part of the oil have escaped during the boiling operation. Such cans have to be resoldered, punched in two or more places, placed in hot oil until they are again filled with oil, when they are removed. The punctures are then filled with solder and the sardines are marketed as seconds.

By the use of my improved cans the operation of punching the cans to allow the air to escape, and then closing the punctures, and the consequent escape of oil and imperfect preservation of the sardines, are avoided, and at the same time the improved cans serve as a test to show whether the soldering has been properly done. Substantially the same result can be obtained by concaving only the tops of the cans; but I prefer to concave both tops and bottoms, as making the operation a little more thorough.

Having thus described my invention, I claim as new and desire to secure by Letters Patent—

1. A sardine-can having its top or bottom concaved and secured within the body of the can, as and for the purpose set forth.

2. In a sardine-can, the combination, with the body A, provided with the offsets $a$, of the concave top B, provided with the flange $b$ and bead $c$, substantially as herein shown and described.

JULIUS WOLFF.

Witnesses:
JAMES T. GRAHAM,
EDGAR TATE.